United States Patent
Wootton et al.

(10) Patent No.: US 9,287,703 B2
(45) Date of Patent: Mar. 15, 2016

(54) GENERALIZED SYSTEM ARCHITECTURE FOR PERIPHERAL CONNECTIVITY AND CONTROL

(75) Inventors: Matthew Wootton, O'Fallon, MO (US); Travis Dierks, Wentzville, MO (US)

(73) Assignee: DRS Sustainment Systems, Inc., St. Louis, MO (US)

( * ) Notice: Subject to any disclaimer, the term of this patent is extended or adjusted under 35 U.S.C. 154(b) by 905 days.

(21) Appl. No.: 13/460,598

(22) Filed: Apr. 30, 2012

(65) Prior Publication Data

US 2013/0285447 A1 Oct. 31, 2013

(51) Int. Cl.
*H02J 1/08* (2006.01)

(52) U.S. Cl.
CPC ............... *H02J 1/08* (2013.01); *Y10T 307/305* (2015.04)

(58) Field of Classification Search
CPC .............................. B60R 16/0207; H02J 1/08
USPC ..................... 307/18; 174/72 A; 439/502, 623
See application file for complete search history.

(56) References Cited

U.S. PATENT DOCUMENTS

| | | | |
|---|---|---|---|
| 5,481,635 A | 1/1996 | Arroyo et al. | |
| 5,971,799 A * | 10/1999 | Swade | 439/502 |
| 6,249,060 B1 * | 6/2001 | Osha | 307/10.1 |
| 6,252,169 B1 * | 6/2001 | Gegusch-Brunner et al. | 174/71 R |
| 6,967,414 B1 * | 11/2005 | Wedding et al. | 307/9.1 |
| 7,260,654 B1 | 8/2007 | Satapathy et al. | |
| 7,612,470 B2 | 11/2009 | Pincu et al. | |
| 2004/0150267 A1 * | 8/2004 | Ferguson | 307/70 |
| 2009/0052122 A1 * | 2/2009 | Johnson et al. | 361/643 |
| 2012/0028680 A1 * | 2/2012 | Breed | 455/556.1 |
| 2012/0064772 A1 * | 3/2012 | Pocrass | 439/625 |

OTHER PUBLICATIONS

United States Department of Defense, "Interface Standard for Aircraft/Store Electrical Interconnection System," MIL-STD-1760D, Aug. 1, 2003, 187 pages.

* cited by examiner

*Primary Examiner* — Jared Fureman
*Assistant Examiner* — Brett Squires
(74) *Attorney, Agent, or Firm* — Kilpatrick Townsend & Stockton LLP

(57) ABSTRACT

Generally, systems, devices, and methods for a generalized architecture for power and networking in robotic systems is presented. On a robotic chassis, a branching cable harness routes multiple power connections and communications interfaces from an onboard computer and multiple power supplies to various locations on the chassis. Each branch carries all the power and communications connections that are needed by various peripherals, and all the branches terminate with identical connectors. A custom patch cable for each peripheral, such as a camera, taps the appropriate power and communications interfaces from the branches for the peripheral. The peripherals can be relocated on the chassis by unplugging their respective patch cables from the central cable, relocating, and then plugged the patch cables into the nearest branch.

18 Claims, 9 Drawing Sheets

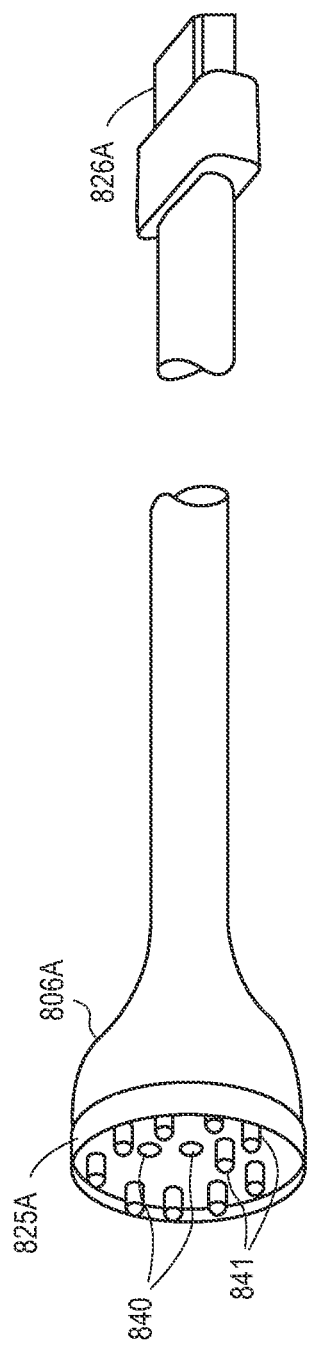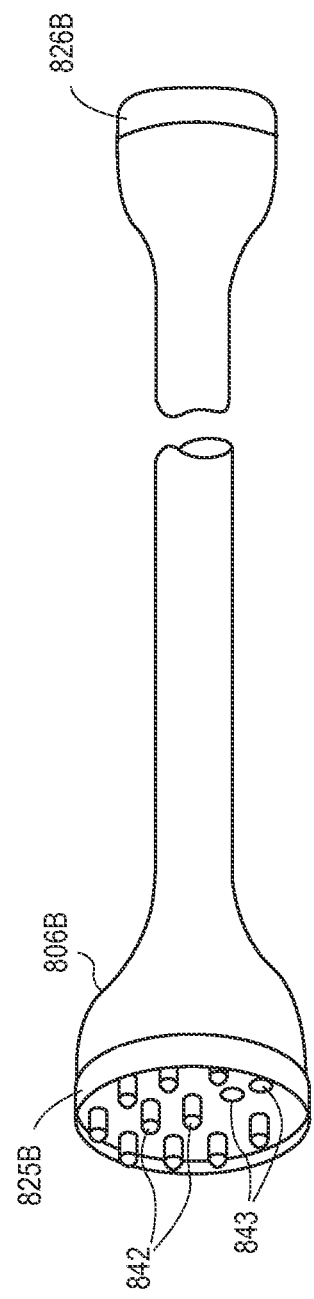

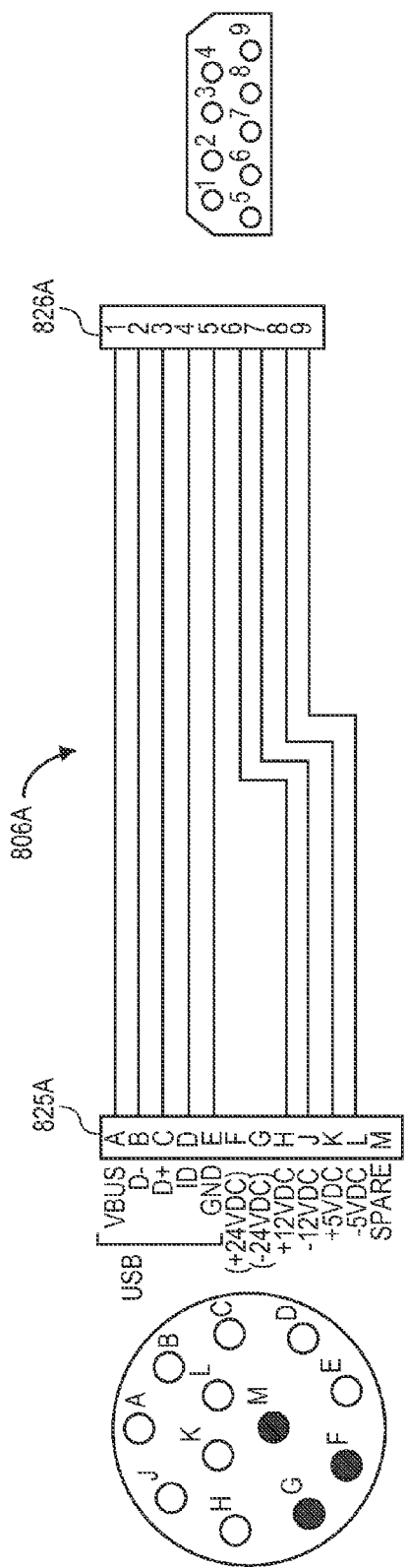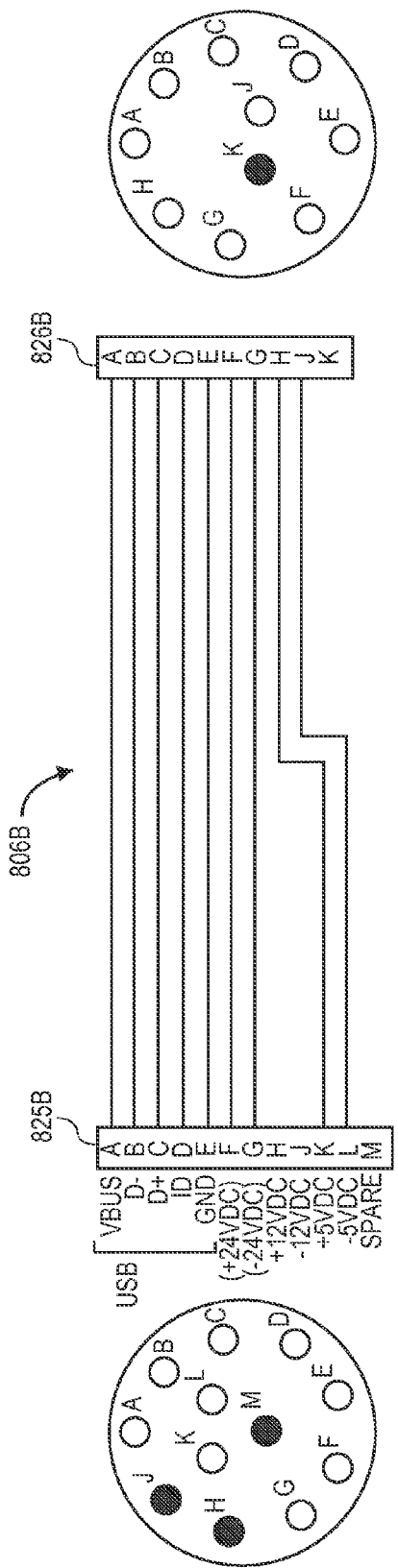
FIG. 9A
FIG. 9B

GENERALIZED SYSTEM ARCHITECTURE FOR PERIPHERAL CONNECTIVITY AND CONTROL

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Art

This disclosure is generally related to electrical transmission and networking systems, and more specifically to supplying diverse power and data to uniform tap points in robotic vehicles so that different peripherals can be swapped and reconfigured.

2. Background

Mobile robotic systems have become more prevalent as time progresses. In the past, such systems were used only by those who could afford them in places where the risk to humans was extreme. For example, mobile robots have been used by government space agencies for planetary exploration, nuclear agencies for damage assessments in radioactive chambers, police departments for bomb disposal, oil companies for undersea drilling, and militaries for mine clearance. As technologies have improved, mobile robots have become more pervasive and less expensive. More industries can afford their use, and they have been put to use in areas where there is less risk to humans or where the cost of the robots is offset by the savings in human labor. For example, aerial drones have been used for border surveillance, wheeled robots for crop harvesting, and tracked robots for companies' intra-office mail delivery.

Robotic systems are typically an assemblage of components, such as motors, sensors, and computers. Naturally, as the components improve, better robots can be made. As components become faster, more accurate, and less expensive, the robotic systems that incorporate the components can become more nimble, interact with humans better, and be available to a wider audience.

With technological advances of components come more communication interface standards for the various components of robots. For example, computers have evolved from using RS-232 serial ports and parallel ports to using the Universal Serial Bus (USB®) and HDMI® communication standards. Robots' communication systems have followed suit. Because old communication standards stay around for a long time for backward compatibility while new standards ramp up in popularity, it is not uncommon for different components to incorporate different communication interface standards. This has been an ever-present problem in the computer industry.

Yet, robotics incorporates more than just computers. Robotic systems typically pull an eclectic mix of components from the motor, sensor, vehicle, and other arts. Mobile robotic systems, especially ruggedized systems for outdoor use, sometimes pull components originally made for automobiles, boats, aircraft, or military systems. Power requirements, such as voltage levels and current draws, for the various components may be drastically different from one another because they are pulled from various arts. Especially for robots that can transport themselves from one place to another or are otherwise mobile, having various power and communications interfaces are a problem because they add size and weight to the robot.

Consequently, many current robotic systems are highly integrated with a specific set of cabling and connections required for each possible system configuration. This leads to the creation and management of many different fixed system level variants, where the elements of such systems cannot be changed without creating a new fixed system variant. For example in the military, an entirely different robot may be needed for chemical detection versus one that is wired for mine detection. Having separate robots for the tasks is typically more expensive and requires a broader logistics trail than having one reconfigurable system.

There is a need in the art for less expensive robotic systems.

BRIEF SUMMARY

Generally, systems, devices, and methods of the present invention are related to robotic systems with generic, uniform tap connections for power distribution and data communication. Peripherals can be swapped and re-located among the uniform tap locations. A robot can have a central wire harness that at one end connects to all the power supplies and computing resources that will be needed for the various array of peripherals. On the other end, the wire harness branches off to uniform connectors, providing power from all the power supplies and computing resources to every uniform connector. A relatively short, customized patch cable then connects each desired sensor, motor, end effector, or other peripheral for the robot to the uniform tap connector. Each patch cable ensures that the appropriate power and network connection is connected to the peripheral. Common design hard mount points can be provided for mounting the peripherals as well.

In addition, the patch cables can incorporate a translator, optionally embedded in the cable itself, to translate to/from the peripheral to a standard data communication interface.

Some embodiments of the present invention are related to a mobile robotic system having multiple common interfaces for user-relocatable peripherals. The system includes a chassis, multiple power supplies, at least one communication interface, a plurality of common connectors located on positions distributed around the chassis, each common connector operatively connected with the multiple power supplies and the at least one communication interface, the common connectors having an identical power and communication layout with respect to one another, and a set of patch cables for connecting the common connectors with different peripherals, each patch cable adapted to mate with any of the common connectors and tap appropriate power and communications lines for a respective peripheral. The different peripherals and associated patch cables can be moved to different positions around the chassis by an end user without re-wiring the chassis Some embodiments are related to a power and signal distribution system for a robotic system. The system includes a first power supply, the first power supply adapted to provide a first voltage, a second power supply, the second power supply adapted to provide a second voltage, a third power supply, the third power supply adapted to provide a third voltage, at least one communication interface, the at least one communication interface adapted to send or receive signals, a central cable having a first end and a plurality of branches opposite the first end, each branch of the central cable having a common branch connector, each common branch connector having a same type and size as all of the other common branch connectors of the central cable, each common branch connector having an identical layout of power and signal connection points with respect to the other common branch connectors, the connection points of each common branch connector operatively connected through the first end of the central cable with the first power supply, the second power supply, the third power supply, and the communication interface, and a first patch cable and a second patch cable, each patch cable having a common proximal connector configured to mate with any of the common branch connectors of the central cable, each patch cable having a distal connector opposite the respective proximal connector, in which the first patch cable distal connector is not operatively connected with the second power supply and the second patch cable distal connector is not operatively connected with the first power supply.

Some embodiments are related to a method of reconfiguring peripherals on a robotic system. The method includes providing a central cable on a robotic system, the central cable having multiple branches with identical common connectors, the common connectors each connected through the central cable to multiple power supplies and at least one communication interface, providing a first peripheral and a second peripheral for a robotic system, the first and second peripherals having different power requirements from one another, connecting a first patch cable between the first peripheral and a first branch of the central cable, powering the first peripheral through the first branch of the central cable, disconnecting the first patch cable from the first branch of the central cable, connecting the first patch cable to a second branch of the central cable, connecting the second patch cable between the second peripheral and the first branch of the central cable, and powering the first and second peripherals through the second and first branches of the central cable, respectively.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention.

FIG. 8A illustrates a patch cable in accordance with an embodiment.

FIG. 8B illustrates another patch cable in accordance with an embodiment.

FIG. 9A is a wire diagram of the patch cable in FIG. 8A.

FIG. 9B is a wire diagram of the patch cable in FIG. 8B.

DETAILED DESCRIPTION

Some circumstances leading the inventors to aspects of this invention centered around the purpose-built nature of prior art system integration efforts specifically targeted at robotics. In examination of this problem, the inventors determined that it would be possible to create a generalized system architecture for peripheral connectivity and control. That is, a generic architecture that is capable of accepting different end peripherals and starting computing and power elements where the end peripherals are connected and controlled through generalized interfaces regardless of the particular connectivity requirements of the peripheral. This generalized method allows for the rapid design and/or development of connectivity solutions based upon the available standards of the attached computing element.

Technical advantages of embodiments of the invention are many. Using the generalized system for peripheral connectivity and control, a system can be integrated one time and utilized with many different components, as distinct from current systems which often require a new systems integration effort any time a component is changed. When comparing the proposed architecture with those that currently exist, the proposed architecture enjoys the benefit of being implemented one time on a given system while allowing for reconfiguration of computing elements, power sources, and end peripherals without the need to change the connective elements between them.

Utilizing the generalized system architecture for peripheral connectivity and control, there can be one core variant of a robot that can be field configured to perform different functions without the need to manage each possible system configuration separately.

The proposed architecture of some embodiments observes advantages over prior art architectures in that it enables plug-and-play capabilities of peripherals with different communication standards and power requirements. Prior art architectures are commonly designed for specific peripherals which can only operate on a single, pre-defined communications protocol and with only one option for available power.

The proposed architecture also enjoys advantages in vast expandability whereas prior art architectures are typically defined to support a limited and predetermined number of homogeneous peripherals.

Figure 1:
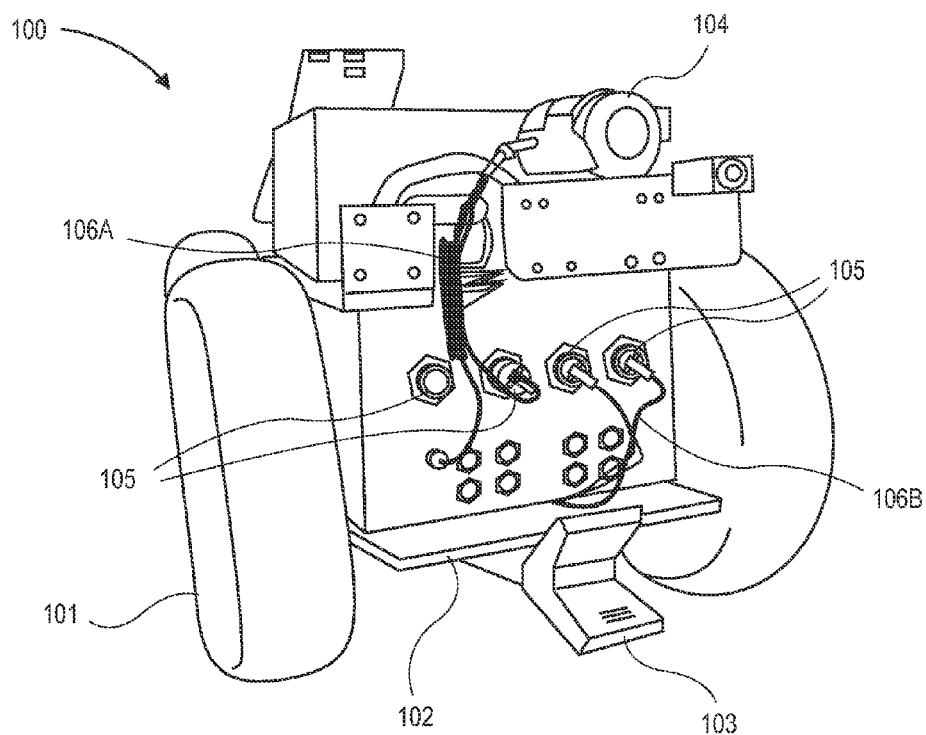
FIG. 1 illustrates a wheeled robotic system in accordance with an embodiment.

FIG. 1 is an elevation view, in perspective, of a front of a wheeled robotic system in accordance with an embodiment. Mobile robotic system 100 includes wheels 101, chassis 102, and various peripheral components. Ruggedized video camera 104 is mounted toward the top of the chassis in order to best see obstacles. Detector 103 is mounted near the bottom of the chassis in order to be close to the ground.

Four common connectors 105 are mounted to the front of the robot. Common connectors 105 are all same-sized circular connectors of the military standard (MIL STD) 38999 variety. Besides being identical in style, size, gender, and pin/socket locations, these uniform connectors are identical in their pinouts or layouts. That is, across the four connectors, each pin/socket position carries the same power or communications signal in the same position.

Patch cables 106A and 106B connect two of common connectors 105 to camera 104 and detector 103, respectively. Patch cable 106A is wired to connect camera 104 to the appropriate power for the camera. For example, if the camera requires twelve volts (positive) of direct current in order to operate, patch cable 106A connects the input power pins on the camera to +12 VDC and neutral on the common connector. Likewise, patch cable 106B is wired to connect detector 103 to the appropriate power for the connector. For example, if the detector requires twenty four volts (positive) of direct current in order to operate, patch cable 106B connects the input power pins on the detector to +24 VDC and neutral on the common connector.

Similarly to their connections for power, patch cables 106A and 106B are wired for appropriate communications for camera 104 and detector 103 respectively. For example, if the camera communicates over 10 BaseT Ethernet, then patch cable 106A connects the data pins on the camera to Ethernet twisted pair contacts on the common connector. If the detector communicates over USB, then patch cable 106B connects the data pins on the detector to the USB data lines on the common connector.

Other peripherals can be added to the other common connectors. For example, if a laser rangefinder is needed, it can be plugged into one of the two available common connectors 105 with an appropriate patch cable.

If there is a problem with camera 104, one can troubleshoot the connections by simply unplugging patch cable 106A from its current common connector 105 and plugging it into a different common connector 105. This can help an end user narrow down the possibilities of problems with the camera.

If any of the peripheral connectors is cracked, waterlogged, or otherwise damaged, other connectors can be substituted by an end user without re-wiring the chassis.

In the prior art, aircraft hard points have been wired with common connectors in order to connect with different types of stores, such as gravity bombs, missiles, gun and camera pods, electronic defense systems, and fuel tanks. These hard point locations are plug-and-play interchangeable so that the stores can be loaded in any configuration. For example, the MIL-STD-1760 aircraft/stores electrical interconnection system standard describes such a system, which provides 28 VDC, three-phase wye 400 Hz 115/200 VAC, and 270 VDC aircraft power. However, such standards typically specify only one type of power or communication standard. For example, the MIL-STD-1760 standard specifies only one data communication interface, the MIL-STD-1553 interface. Moreover, a patch cable that a user can plug and unplug is not provided for each store. Patch cables in the air stream would cause drag and presumably whip against the sides of the aircraft or store if they were not properly buttoned down. Accordingly, many aircraft stores are simply built to use the standard circular connector specified by MIL-STD-1760. Designers of consumer electronics or other peripherals rarely design to the specification of a robot.

Figure 2:
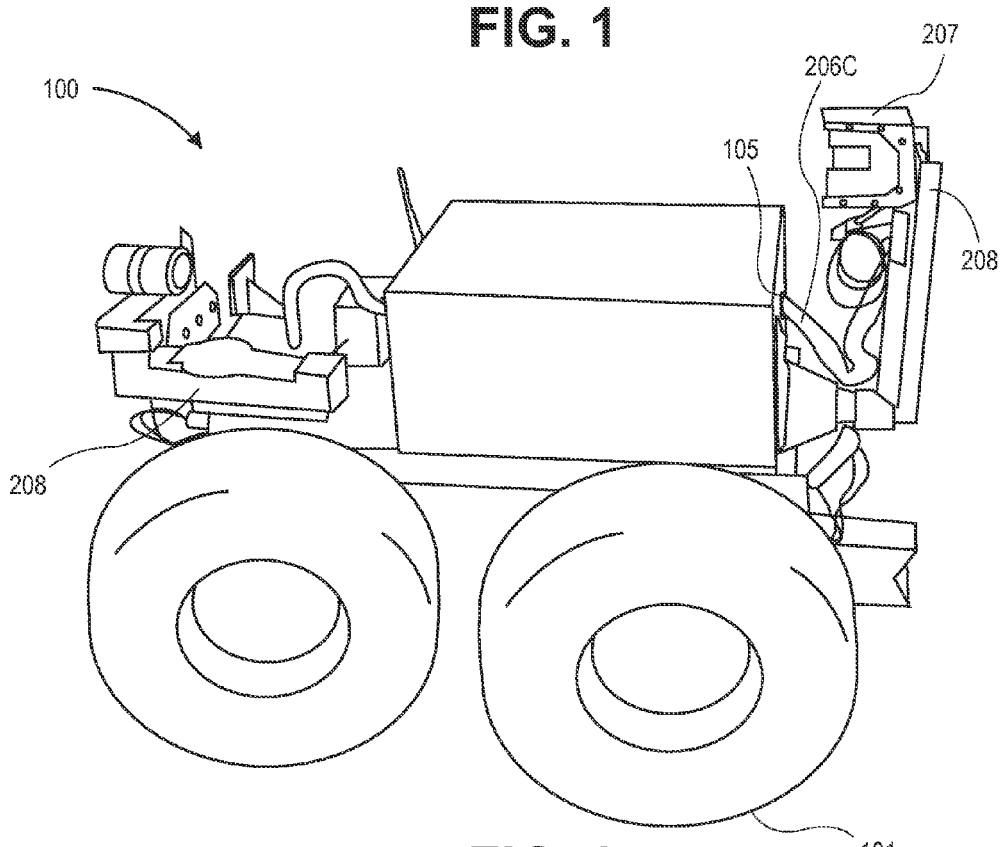
FIG. 2 illustrates another view of the wheeled robotic system of FIG. 1.

FIG. 2 illustrates another view of the wheeled robotic system of FIG. 1. Protruding up from the rear of system 100 is mast camera 207. Mast camera 207 is connected to its power and communications through patch cable 206C to nearby common connector 105. Mast camera 207 uses USB; therefore, patch cable 206C connects the data connections of mast camera 207 to USB connections on common connector 105.

One of the rigid mechanical mounts 208 physically connects mast camera 207 to the mast on robotic system 100. Mechanical mounts 208 include a thumbscrew so that a user can remove and remount the mast camera as required in the field. For example, mast camera 207 can be disconnected from mechanical mount 208 in the rear and remounted onto mechanical mount 208 on the front of wheeled robot 100.

Figure 3:
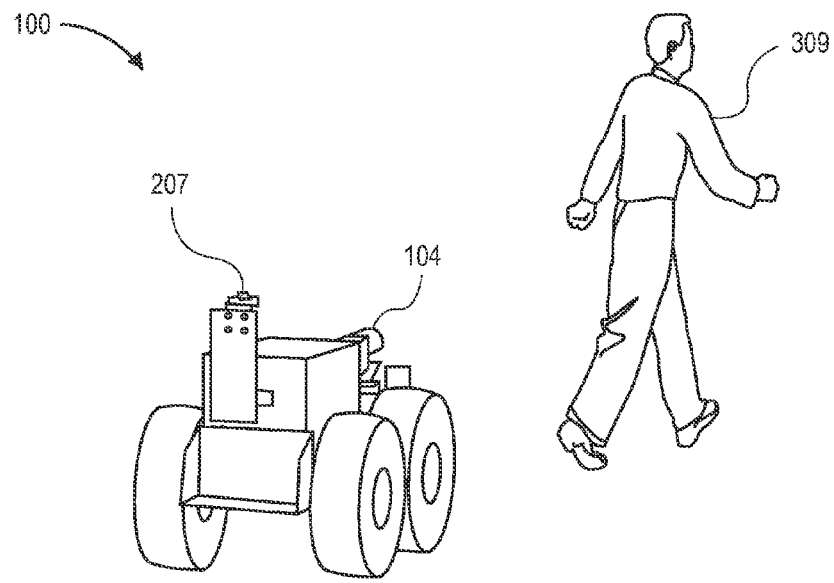
FIG. 3 illustrates the wheeled robotic system of FIG. 1 tracking a human using its sensors.
Figure 4:
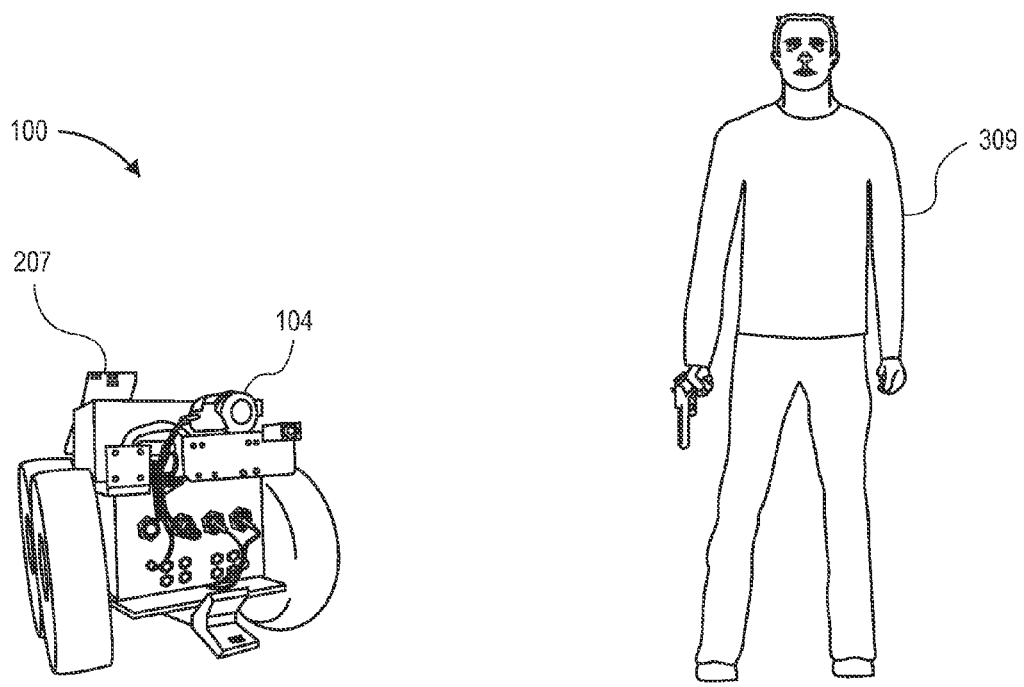
FIG. 4 illustrates the wheeled robotic system of FIG. 1 tracking a human using its sensors.

FIGS. 3 and 4 illustrate the wheeled robotic system of FIG. 1 tracking a human using its sensors. Using front-mounted camera 104 and mast-mounted camera 207, robot 100 tracks individual 309.

Although front-mounted camera 104 uses Ethernet and mast-mounted camera 207 uses USB, both cameras are able to communicate their images to a central processor. If a user determines that the camera locations should be swapped (i.e., mast camera 207 should be put where camera 104 is and vice versa), then a user can simply unplug and un-mount the cameras and replug and remount them in their new positions using their associated patch cables. No re-wiring of the chassis is required, such as soldering connections or twisting wires together.

If the cameras must be recalibrated in their new positions, software onboard the robot can automatically perform the calibrations, providing a seamless plug-and-play experience for the user.

Figure 5:
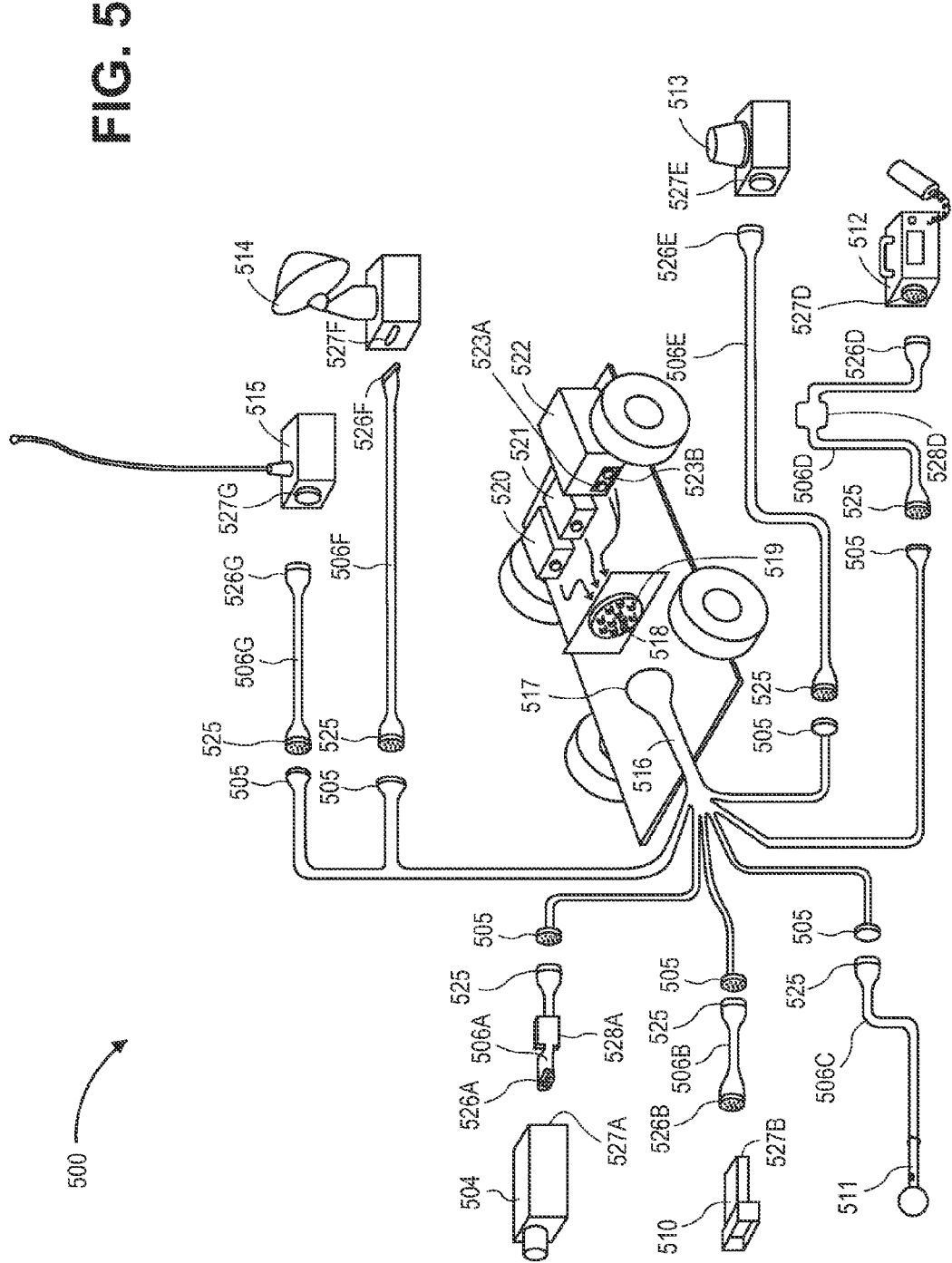
FIG. 5 illustrates a power and data distribution system in accordance with an embodiment.

FIG. 5 is an exploded view of a power and data distribution system in accordance with an embodiment. Distribution system 500 includes 5 VDC power supply 520, 12 VDC power supply 521, and central processing unit (CPU) 522. CPU 522 includes two communication interfaces, RS-232 communication interface 523A and USB communication interface 523B. Power supplies 520 and 521 and communications interfaces 523A and 523B are connected to contacts 519 of central connector 518. All the power and communications for all of the peripherals mounted on chassis 502 go through central connector 518.

Other types of communication interfaces besides RS-232 and USB are suitable, such as Ethernet, RS-170, RS-422, IEEE 1394, and HDMI®.

Some of the contacts 519 of central connector 518 are operatively connected with the voltage of power supply 520, some of the contacts 519 are operatively connected with the voltage of power supply 521, some of the contacts 519 are operatively connected with communications interface 523A, and some of the contacts 519 are operatively connected with communications interface 523B.

"Operatively connected with" includes electrically connected by metal wire conductors, pins, sockets, blades, and other contacts, but does not necessarily include such connections to a common neutral or ground. Indeed, a device may be said to not be operatively connected with a power supply even though its chassis ground is electrically connected to the power supply or its neutral—which is shared from another power supply—is electrically connected with the device. "Operatively connected with" also includes operational connections configured for power, communication, mechanical mounting, or other operations for which the connection is intended or as otherwise known in the art. For example, a fiber optic cable can operatively connect two items if light is transmittable from a transmitter in one item through the wire to a receiver in the other item.

A "voltage" includes a direct current voltage, an alternating current voltage (with a numerical value referencing peak or root mean squared (rms) engineering units) or as otherwise known in the art.

Central connector 518 is mated to by mating connector 517 of central cable 516. Central cable 516 is essentially a wire harness from which power and communications are distributed throughout chassis 502.

"Central" as used herein as an adjective indicates a logical centricity and does not necessarily indicate that the object of the modified noun is in the physical center or middle of another object.

In the exemplary embodiment, central cable 516 splits into seven branches, delivering power from power supplies 520 and 521 and RS-232 and USB interfaces 523A and 523B to different locations on the robot. Each of the seven branches of the central cable 516 terminates in a common connector, making for seven common connectors 505. Each common connector 505 shares the same power and communications layout as the other common connectors 505.

A circular type of connectors is shown in the figure for the common connectors. However, D-sub and MOLEX® types are suitable as well as other types of connectors as known in the art.

MOLEX® is a registered trademark of Molex Inc. of Lisle, Ill. MOLEX® type connectors have been in use since the late 1930s, and they have become synonymous with a wide variety of plastic connectors in the automobile industry.

Proximal connectors 525 of patch cables 506A, 506B, 506C, 506D, 506E, 506F, and 506G mate with common connectors 505 of central cable 516. Each patch cable is wired differently so that it provides the proper power and communications interface to its associated peripheral.

Two of the patch cables, patch cables 506A and 506D, have translators embedded therein. Translator 528A is embedded in cable 506A, and translator 528D is embedded in cable 506D. Translators 528A and 528D translate RS-170 from their respective peripherals to RS-232 for communications interface 523A and back again. Having translators embedded within the patch cable lessens the chance of the translator being lost or connected with the wrong device. Embedding also protects the small translators from the elements and from being crushed while in use in the field. Other types of translators, such as USB-to-RS-422 translators, can also be used.

Each patch cable, save patch cable 506C, has a distal connector that connects with a mating connector on its associated peripheral. Distal connectors 526A, 526B, 526D, 526E, 526F, and 526G connect with mating connectors 527A, 527B, 527D, 527E, 527F, and 527G on peripherals 504, 510, 512, 513, 514, and 515, respectively.

Many of the distal connectors are of different types from one another, depending on the native connector of the peripheral. For example, camera 504 comes with D-sub connector 527A, while FIDO® portable explosives detector 510 comes with a MIL-C-STD D38999 connector 527B. Therefore, distal connector 526A of patch cable 506A is a D-sub type, while distal connector 526B of patch cable 506B is a MIL-C-STD D38999 series connector.

Interfacing all of the different connector types from different peripherals is a common struggle for designers of useful robots that incorporate many different consumer, industrial, and military technologies. A camera, laser rangefinder, lidar, radar, sonar, microphone, explosives detector, Geiger counter, and end effector may have a mix of different connectors, power requirements, and communications protocols.

Patch cable 506C is integrated with peripheral 511 such that there is no user-releasable connector between the two. Such integration of the patch cable can be useful when the peripheral is relatively inexpensive and will probably not be used with other systems.

Figure 6:
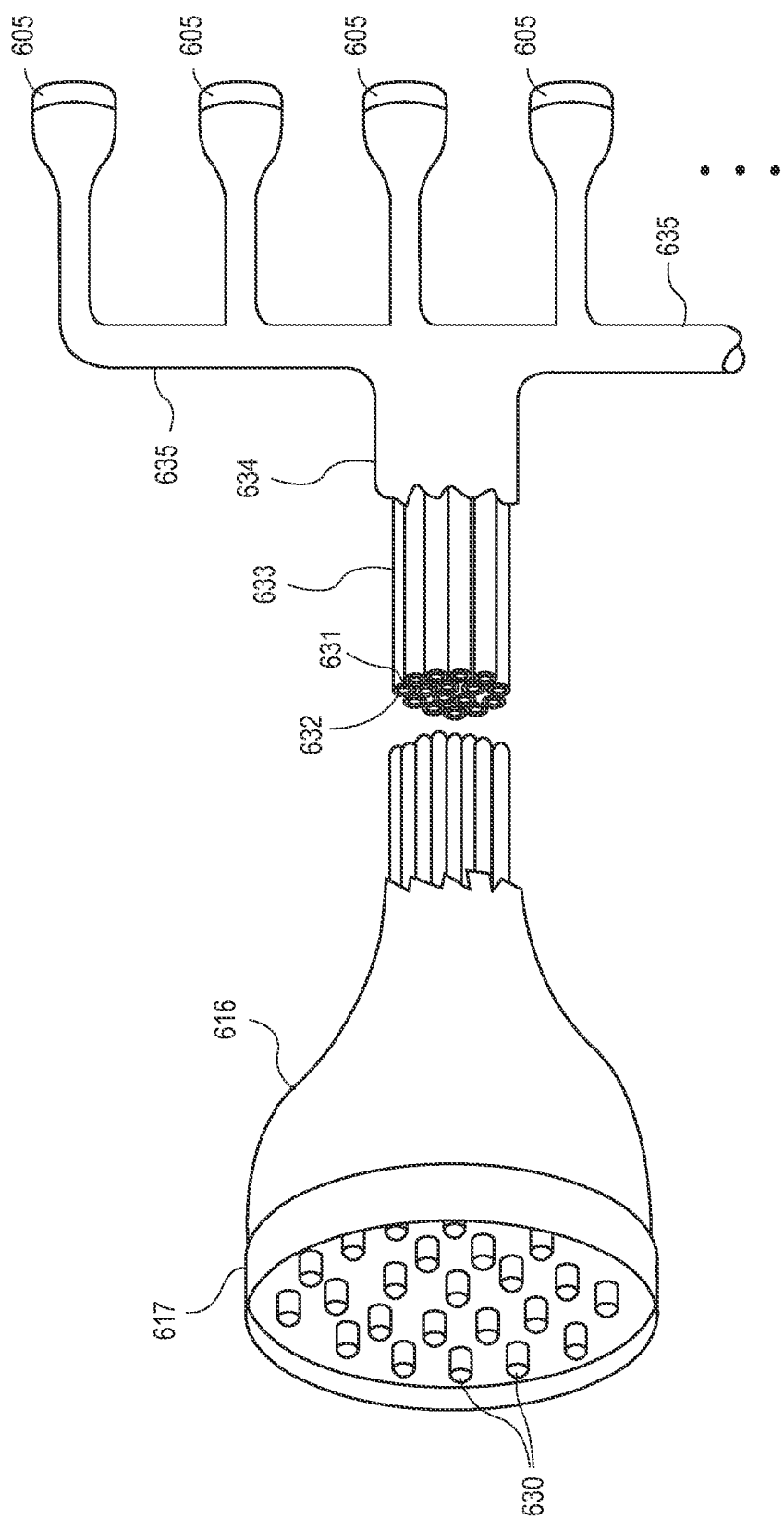
FIG. 6 illustrates a branched wire harness in accordance with an embodiment.

FIG. 6 illustrates a branched wire harness in accordance with an embodiment. On one end, central cable 616 has connector 617 with contact pins 630. On the opposite end, common connectors 605 are situated at the end of each branch 635. Inside central cable 616 run insulated wires 633, each of which has conductor 631 surrounded by insulation 632. Conductors 631 electrically connect pins 630 to sockets in connectors 605. Wires 633 are protected and bound together by wire harness jacket 634.

In some embodiments, coax cables, fiber optic cables, and other means for transmitting signals can be used within wire harness jacket 635 and connected with appropriate connections points at both ends. For example, a fiber optic cable may terminate at an end with a polished glass end that is supported and protected by a polymer shell.

Figure 7:
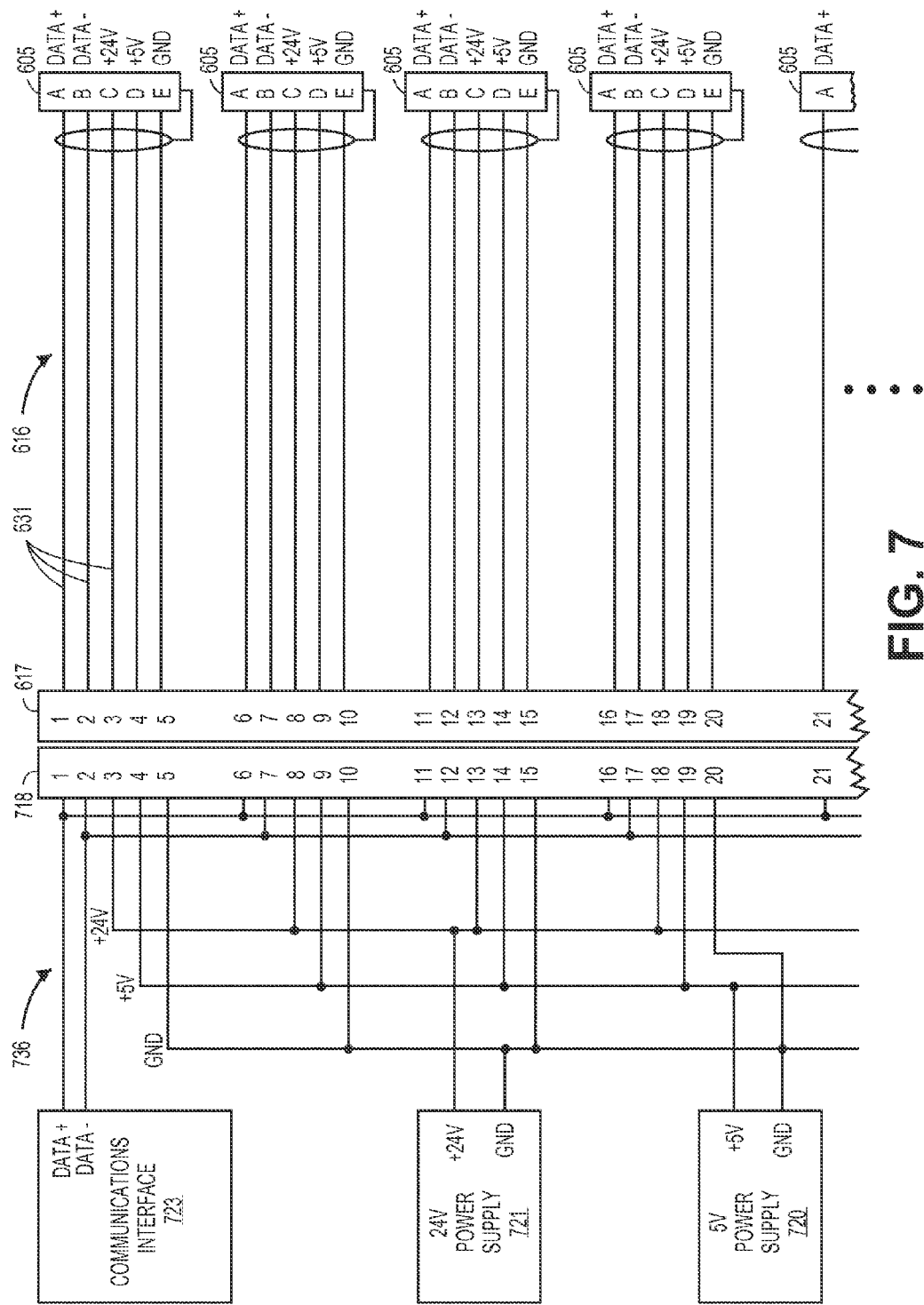
FIG. 7 is a wire diagram of the wire harness in FIG. 6.

FIG. 7 is a wire diagram of the wire harness in FIG. 6. The figure also includes a wire diagram of a mating cable harness that feeds power and communication to the central cable.

Central cable 616 includes large connector 617 on one end and common connectors 605 on the branches of the opposite end. In the exemplary embodiment, each conductor 631 passes from one pin on large connector 617 to one socket among connectors 605. Routing and splicing are performed within feed cable 736.

Feed cable 736 includes central connector 718, which is fed from power supply 720, power supply 721, and communications interface 723. Connections are routed appropriately using wire splices, distribution hubs, conductive rails, or other means known in the art. For example, the +5V output of power supply 720 is fed to connections that feed +5V, with respect to ground, to each common connector.

In the embodiment shown in the figure, power supplies 720 and 721 share a common neutral/ground; however, separate neutrals may be provided.

Because each common connector 605 has an identical ordered list of power and communications, it can be said that the common connectors 605 share an identical power and communication layout with respect to one another.

FIGS. 8A-8B illustrate patch cables in accordance with an embodiment. Patch cables 806A and 806B have the same type and size of connectors 825A and 825B on their proximate ends. However, they are wired differently so that they tap different wires for their respective peripherals.

Patch cable 806A connector 825A has some connections that are not connected. Positions 840 are missing pins so that they do not operatively connect with a mating common connector. Meanwhile, positions 841 include pins so that they can mate with sockets in the mating common connector. The conductors in positions 841 run to distal connector 826A, along with the other conductors in patch cable 806A.

Patch cable 806B connector 825B has pins in positions 842 but is missing pins 843. The conductors in positions 842 run to distal connector 826B, along with the other conductors in patch cables 806B. The differences in connections 840/841 and 842/843 reflect the tapping of different power and/or communications lines.

FIGS. 9A-9B are a wire diagrams of the patch cables in FIGS. 8A-8B, respectively. Patch cables 806A and 806B have identically sized/typed proximate connectors 825A and 825B. Proximate connectors 825A and 825B are wired differently in that the connections ±24 VDC are not connected in connector 825A and the connections for ±12 VDC are not connected in 825B.

The face-on pinout diagrams for connectors 825A, 826A, 825B, and 826B reflect different power layouts. For example, connections G and F are unconnected in connector 825A while connections H and J are unconnected in connector 825B.

Distal connector 826A, a D-connector, is of a different type and size then connector 826B, a circular connector. They also have a different number of pins/sockets. Nine-pin D-connector 826A cannot be plugged into 10-pin circular connector 826B. These connectors plug into their respective peripherals.

Figure 10:
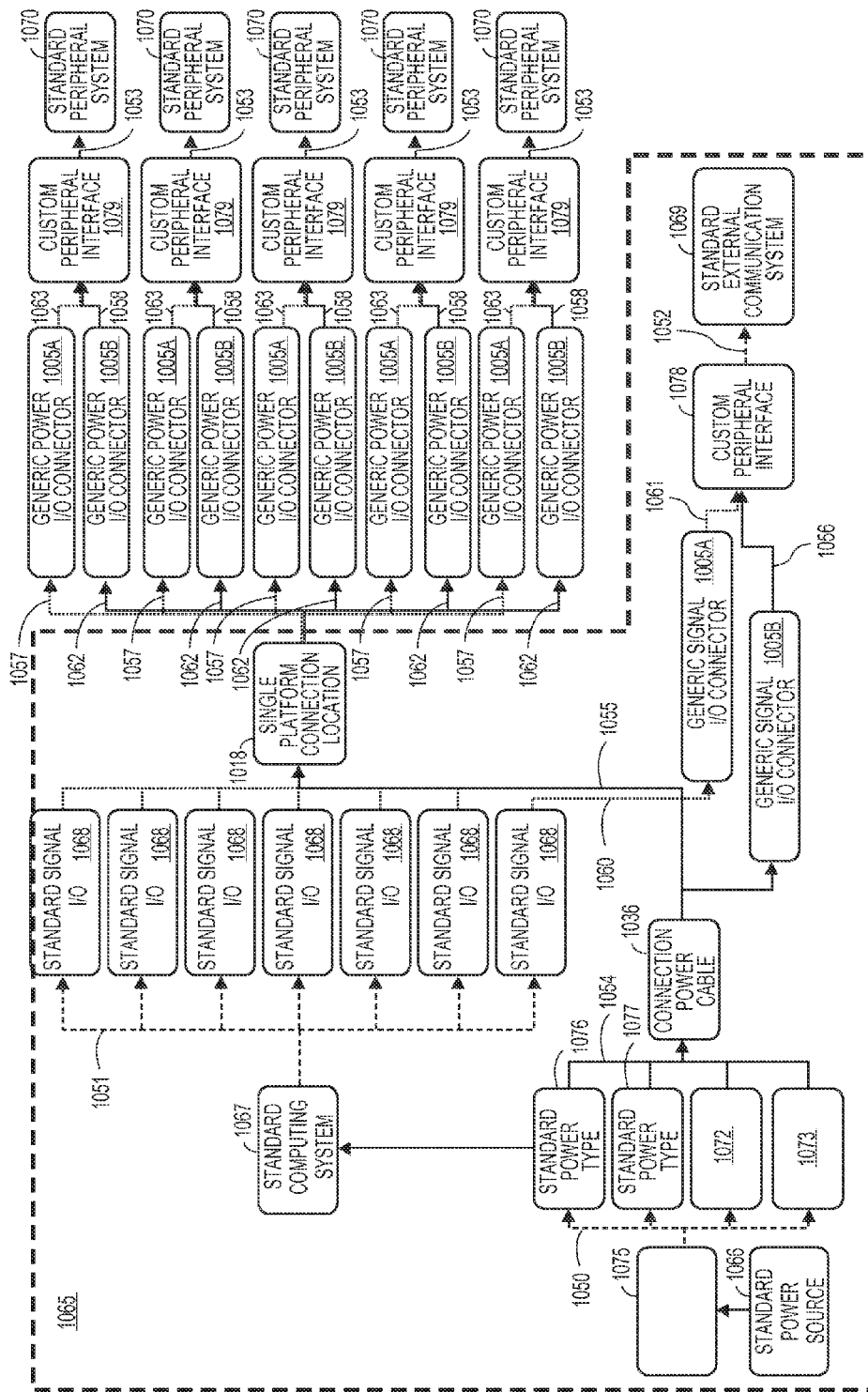
FIG. 10 is a system-level schematic in accordance with an embodiment.

FIG. 10 is a system-level schematic in accordance with an embodiment. This figure describes a methodology for connecting and controlling standard peripherals through standard computing equipment and standard power sources. The system as a unit provides for simplified integrations of new components as the technology of the components evolves within a given architecture. Through crafting the system for generalization, it is possible to ensure the long-term viability of the system design while minimizing the number of custom component requirements and permitting rapid design iteration of custom components to allow more elements to be placed into the system.

In the figure, dashed lines 1050, 1051, 1052, and 1053 indicate a persistent connection between elements, such as the standard signal input/output being persistently attached to the standard computing system. Solid lines 1054, 1055, 1056, 1057, 1058, and 1059 indicate the flow of power, whether it be transmitted through wires or wirelessly utilizing any of the various wireless available technologies. Dotted lines 1060, 1061, 1062, and 1063 indicate the transmission of signals, both wired and wireless, using any of a variety of methods and protocols. The boundary around system 1065 indicates the elements of the system which are self-contained as distinct from those which typically reside on the final platform. Elements 1066, 1067, 1068, 1069, 1070, and 1071 are those that are standard hardware that has not been permanently modified in order to interact with the system. The elements 1072 and 1073 are those elements which enable the system integration functionality. The blocks 1075, 1076, 1077, 1078, and 1079 are the customized elements which enable the system compatibility with standard equipment. The number of interfaces indicated in the figure is for illustrative purposes only and not limiting in either direction. There may be as few as one peripheral attached, or as many as could potentially be conceived.

Common power cable 1036 feeds power and another integrated cable feeds standard signal I/O to single platform connection location 1018. This power and signal interface is branched through to generic signal connectors 1005A and generic power connectors 1005B. A single physical connector can incorporate both generic signal connector 1005A and generic power connector 1005B.

The generalized system architecture for peripheral connectivity and control provides advancement over the current technological space by providing for a method of integrating new technology through the simple creation of custom peripheral interfaces which direct the appropriate power and signals to the respective end peripherals. These peripheral interfaces may be wired or wireless in terms of power and signal technology and additionally provide the mechanical mounting requirements for the system. By integrating these elements into the custom peripheral connection, any peripheral can be easily integrated without changes in the system architecture. Since the system architecture remains constant, and additional peripherals can be added and controlled without permanent modification, we describe the system as a generalized system architecture for peripheral connectivity and control.

The design of the custom peripheral interfaces for the standard peripheral systems to be attached can provide the necessary power and signal conversion required to connect and control the peripherals. Such a design should attach to generic power and signal interfaces according to the architectural design, which may not incur additional architecture changes. The power and signal connectivity is provided through a common interface where all power in the proper format is attainable through any number of means. The current embodiment involves a centralized power conversion box which will provide the proper power signal at each end peripheral location to allow for any compatible peripheral to attach at the end location. The signals are intended to all attach to a common data type, which allows for the ease of reconfiguration in the system. These generic signals are what is handled by the system architecture; however, the architecture does not preclude the use of any particular type of signal from the system (e.g., Ethernet, USB, WiFi, WiGig).

The computing system and power source are both standard elements which allow for the overall system to function. In the case of the computing system, its capabilities will determine the actual input/output (I/O) options and signals available to the rest of the system. These are defined by that computing system and direct attachments, but they fit within the architecture according to the embodiment in the figure. All of the signals are routed through a single platform connection location (which is virtual in a wireless configuration), to allow for single point connectivity of the self-contained base system to the remainder of the architecture. As such, the element in system 1065 can be moved to any similar system as a unit without needing to move the remainder of the architecture. Since this is accomplished with a single point connection, it makes the movement of the system a quick and easy process. In the case of the power source, the standard power types for a system will be defined and any standard power source can be used in conjunction with custom power conversion equipment in order to provide the proper power to the generic power input/output connectors.

The overall benefit of the generalized system architecture for peripheral connectivity and control is that almost any standard peripheral can be easily converted to work within the generalized framework through the use of a single custom interface. By providing the generalized framework, embodiments of the invention can provide for a method of easily designing and configuring systems with this style of functionality.

The generalized architecture provides the model for more ideal integration of peripherals such that system designs can accommodate more peripherals with fewer changes at a faster pace than ever before.

Figure 11:
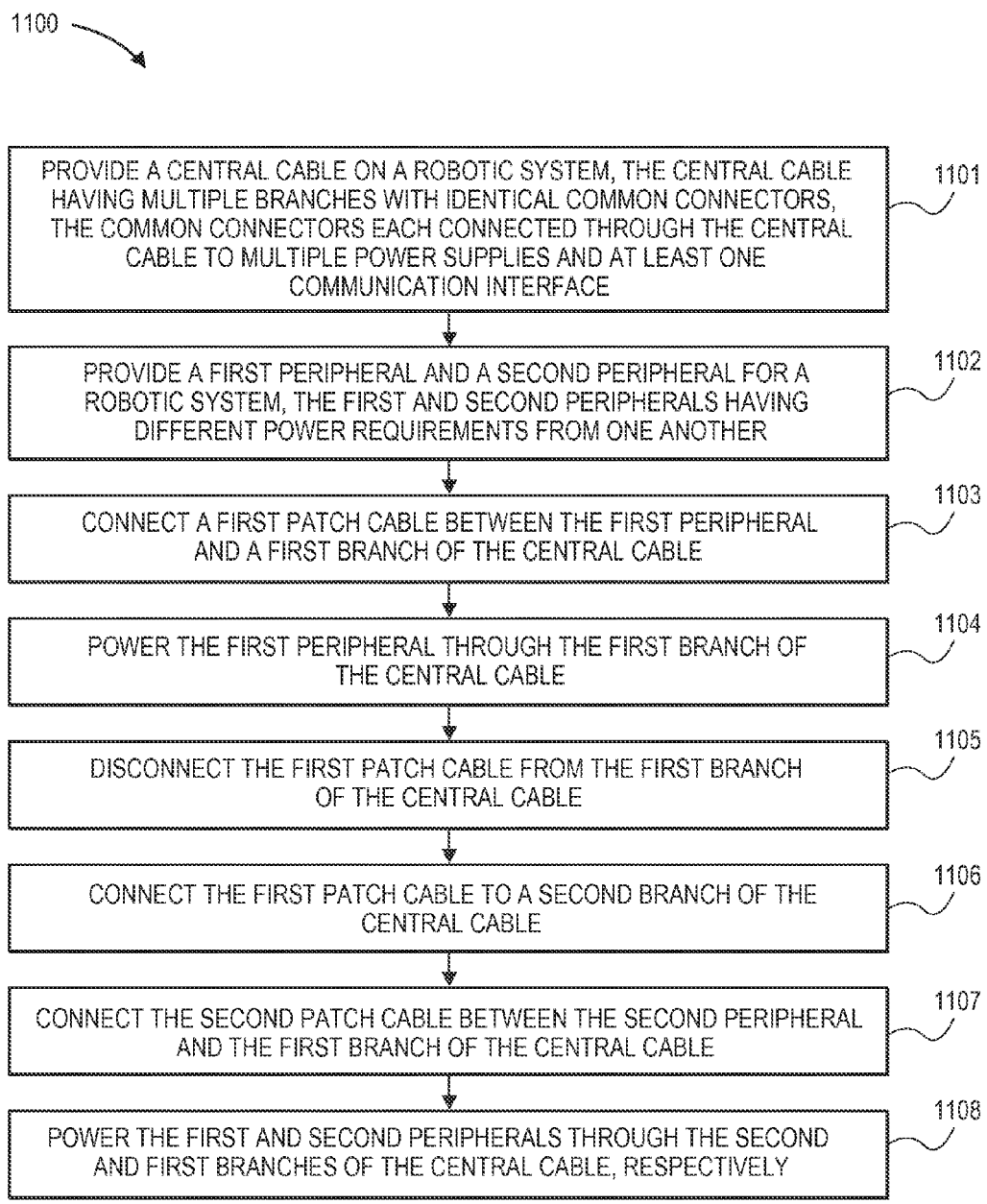
FIG. 11 is a flowchart of a process in accordance with an embodiment.

FIG. 11 is a flowchart of a process in accordance with an embodiment. Process 1100 can be performed by an end user in a field or by others as appropriate. In operation 1101, a central cable is provided on a robotic system, the central cable having multiple branches with identical common connectors, the common connectors each connected through the central cable to multiple power supplies and at least one communication interface. In operation 1102, a first peripheral and a second peripheral are provided for a robotic system, the first and second peripherals having different power requirements from one another. In operation 1103, a first patch cable is connected between the first peripheral and a first branch of the central cable. In operation 1104, the first peripheral is powered through the first branch of the central cable. In operation 1105, the first patch cable is disconnected from the first branch of the central cable. In operation 1106, the first patch cable is connected to a second branch of the central cable. In operation 1107, the second patch cable is connected between the second peripheral and the first branch of the central cable. In operation 1108, the first and second peripherals are powered through the second and first branches of the central cable, respectively. The operations can be performed in the order above or in different orders as applicable.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A robotic system having multiple common interfaces for user-relocatable peripherals, comprising:
    a chassis;
    multiple power supplies;
    at least one communication interface;
    a plurality of common connectors located on positions distributed around the chassis, each common connector operatively connected via conductors with the multiple power supplies and the at least one communication interface, the common connectors having an identical power and communication layout with respect to one another, at least one conductor configured for connecting with a first power supply having a different gauge than a second conductor configured for connecting with a second power supply;
    a set of patch cables for connecting the common connectors with different peripherals, each patch cable adapted to mate with any of the common connectors and tap appropriate power and communications lines for a respective peripheral, whereby the different peripherals and associated patch cables can be moved to different positions around the chassis by an end user without re-wiring the chassis;
    a plurality of common rigid mechanical mounts for the peripherals, each common rigid mechanical mount being identical to one another and located proximate to a common connector; and
    a plurality of thumbscrews, each thumbscrew connected with a corresponding mechanical mount.

2. The system of claim 1 wherein the chassis is of a wheeled vehicle.

3. A power and signal distribution system for a robotic system, comprising:
    a first power supply, the first power supply adapted to provide a first voltage;
    a second power supply, the second power supply adapted to provide a second voltage;
    at least one communication interface, the at least one communication interface adapted to send or receive signals;
    a central cable having a first end and a plurality of branches opposite the first end, each branch of the central cable having a common branch connector, each common branch connector having a same type and size as all of the other common branch connectors of the central cable, each common branch connector having an identical layout of power and signal connection points with respect to the other common branch connectors, the connection points of each common branch connector operatively connected through the first end of the central cable with the first power supply, the second power supply, and the communication interface; and
    a first power conductor in the central cable operatively connected with the first power supply;
    a second power conductor in the central cable operatively connected with the second power supply, wherein the first and second power conductors are of a different gauge than one another;
    a first patch cable and a second patch cable, each patch cable having a common proximal connector configured to mate with any of the common branch connectors of the central cable, each patch cable having a distal connector opposite the respective proximal connector, wherein the first patch cable distal connector is not operatively connected with the second power supply and the second patch cable distal connector is not operatively connected with the first power supply;
    a plurality of common rigid mechanical mounts for peripherals, each common rigid mechanical mount being identical to one another and located proximate to a common branch connector; and
    a plurality of thumbscrews, each thumbscrew connected with a corresponding mechanical mount.

4. The system of claim 3 wherein at least one of the patch cables further comprises:
    a translator adapted to translate signals in correspondence with the communication interface.

5. The system of claim 4 wherein the translator is embedded in the respective patch cable.

6. The system of claim 3 wherein voltages from the first and second power supplies are referenced to a common ground on each common branch connector.

7. The system of claim 3 wherein voltages from the first and second power supplies are referenced to separate ground conductors on each common branch connector.

8. The system of claim 3 wherein there are two or more communication interfaces and the first patch cable distal connector is not operatively connected with one of the two or more communication interfaces.

9. The system of claim 3 further comprising:
    a central connector having contacts operatively connected with the first power supply, the second power supply, and the communication interface, wherein the central cable is connected with the first power supply, the second power supply, and the communication interface through the central connector.

10. The system of claim 9 wherein the central connector and common branch connectors are of the same type.

11. The system of claim 9 wherein a type of the central connector is selected from the group consisting of circular, D-sub, and plastic.

12. The system of claim 3 wherein the type of common branch connectors is selected from the group consisting of circular, D-sub, and plastic.

13. The system of claim 3 wherein the communication interface is selected from the group consisting of Ethernet, RS-170, RS-232, RS-422, Universal Serial Bus (USB), IEEE 1394, and High-Definition Multimedia Interface.

14. The system of claim 3 further comprising:
    a peripheral configured to mate with the first patch cable distal connector, whereby the peripheral is able to connect to power and communications through the first patch cable to any of the common branch connectors.

15. The system of claim 14 wherein the peripheral is selected from the group consisting of a camera, laser rangefinder, lidar, radar, sonar, microphone, explosives detector, Geiger counter, and end effector.

16. The system of claim 14 further comprising:
    a mobile chassis upon which the central cable is mounted.

17. The system of claim 3 wherein the connection points are selected from the group consisting of blades, pins, and sockets.

18. A method of reconfiguring peripherals on a robotic system, the method comprising:
- providing a central cable on a robotic system, the central cable having multiple branches with identical common connectors, the common connectors each connected through the central cable to multiple power supplies and at least one communication interface, at least one conductor connected to a first power supply having a different gauge than a second conductor connected to a second power supply, the gauges of the conductors selected based on the current of the power supplies;
- providing a first peripheral and a second peripheral for the robotic system, the first and second peripherals having different power requirements from one another;
- providing a first common rigid mechanical mount for the first peripheral and a second common rigid mechanical mount for the second peripheral, each of the first and second common rigid mechanical mounts being identical to one another and located proximate to a common connector;
- providing a first thumbscrew connected with the first common rigid mechanical mount and a second thumbscrew connected with the second common rigid mechanical mount;
- connecting a first patch cable between the first peripheral and a first branch of the central cable;
- powering the first peripheral through the first branch of the central cable;
- disconnecting the first patch cable from the first branch of the central cable;
- connecting the first patch cable to a second branch of the central cable;
- connecting a second patch cable between the second peripheral and the first branch of the central cable; and
- powering the first and second peripherals through the second and first branches of the central cable, respectively.

* * * * *